(12) United States Patent
Ruan et al.

(10) Patent No.: US 12,418,399 B2
(45) Date of Patent: Sep. 16, 2025

(54) SECURE MULTI-PARTY COMPUTATION METHODS AND APPARATUSES FOR PRIVACY PROTECTION, AND COMPUTER DEVICES

(71) Applicant: ALIPAY (HANGZHOU) INFORMATION TECHNOLOGY CO., LTD., Zhejiang (CN)

(72) Inventors: Wenqiang Ruan, Hangzhou (CN); Li Wang, Hangzhou (CN); Haoqi Wu, Hangzhou (CN); Weili Han, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 237 days.

(21) Appl. No.: 18/358,690

(22) Filed: Jul. 25, 2023

(65) Prior Publication Data

US 2024/0039697 A1 Feb. 1, 2024

(30) Foreign Application Priority Data

Jul. 25, 2022 (CN) .......................... 202210875263.1

(51) Int. Cl.
*H04L 9/00* (2022.01)

(52) U.S. Cl.
CPC .......... *H04L 9/008* (2013.01); *H04L 2209/46* (2013.01)

(58) Field of Classification Search
CPC ............................ H04L 9/008; H04L 2209/46
See application file for complete search history.

(56) References Cited

U.S. PATENT DOCUMENTS

| 10,833,871 | B2 * | 11/2020 | Ranellucci | H04L 9/3255 |
| 11,329,808 | B2 * | 5/2022 | Ikarashi | H04L 9/32 |
| 11,394,698 | B2 * | 7/2022 | Lev | H04L 9/085 |
| 11,544,571 | B2 * | 1/2023 | Zhong | G06N 3/047 |
| 11,689,371 | B2 * | 6/2023 | Yadlin | H04L 9/3247 |
| | | | | 713/168 |
| 11,847,395 | B2 * | 12/2023 | Raumann | G06F 9/5005 |
| 12,002,157 | B2 * | 6/2024 | Beltrand | G06N 3/0455 |
| 2023/0299942 | A1 * | 9/2023 | Be'Ery | H04L 9/3255 |
| | | | | 713/171 |
| 2024/0304200 | A1 * | 9/2024 | Keshet | G06N 3/09 |
| 2024/0372731 | A1 * | 11/2024 | Kobel | H04L 9/3239 |

* cited by examiner

*Primary Examiner* — Viral S Lakhia
(74) *Attorney, Agent, or Firm* — Fish & Richardson P.C.

(57) ABSTRACT

Embodiments of this specification disclose secure multi-party computation for privacy protection. In an implementation, a method includes obtaining a fragment of first gradient data and a fragment of noise data, where the first gradient data is gradient data of a loss function. Based on the fragment of first gradient data by performing secure multi-party computation with another participant, obtaining a fragment of second gradient data, where the second gradient data is gradient data obtained after the first gradient data is clipped. Based on the fragment of second gradient data and the fragment of noise data, determining a fragment of third gradient data, where the third gradient data is the second gradient data with the noise data added. A fragment of a model parameter is determined based on the fragment of third gradient data.

20 Claims, 3 Drawing Sheets

SECURE MULTI-PARTY COMPUTATION METHODS AND APPARATUSES FOR PRIVACY PROTECTION, AND COMPUTER DEVICES

CROSS-REFERENCE TO RELATED APPLICATIONS

This application claims priority to Chinese Patent Application No. 202210875263.1, filed on Jul. 25, 2022, which is hereby incorporated by reference in its entirety.

TECHNICAL FIELD

Embodiments of this specification relate to the field of computer technologies, and in particular, to secure multi-party computation methods and apparatuses for privacy protection, and computer devices.

BACKGROUND

Nowadays, with rapid development of Internet technologies and information technologies, people have gradually entered the big data era. In the big data era, data are usually distributed and stored in multiple enterprise institutions.

In related technologies, for considerations of data security and privacy protection, the multiple institutions can jointly train a machine learning model by means of secure multi-party computation. A trained machine learning model is used for online service processing, such as risk identification.

SUMMARY

Embodiments of this specification provide secure multi-party computation methods and apparatuses for privacy protection, and computer devices.

A first aspect of the embodiments of this specification provides a secure multi-party computation method for privacy protection. The method is applied to any one of multiple parties, and the method includes the following: obtaining a fragment of first gradient data and a fragment of noise data, where the first gradient data are gradient data of a loss function; obtaining a fragment of second gradient data based on the fragment of the first gradient data by performing secure multi-party computation with another participant, where the second gradient data are gradient data obtained after the first gradient data are clipped; determining a fragment of third gradient data based on the fragment of the second gradient data and the fragment of the noise data, where the third gradient data are the second gradient data with the noise data added; and determining a fragment of a model parameter based on the fragment of the third gradient data.

A second aspect of the embodiments of this specification provides a secure multi-party computation apparatus for privacy protection. The apparatus is applied to any one of multiple parties, and the apparatus includes the following: an acquisition unit, configured to obtain a fragment of first gradient data and a fragment of noise data, where the first gradient data are gradient data of a loss function; a secure multi-party computation unit, configured to obtain a fragment of second gradient data based on the fragment of the first gradient data by performing secure multi-party computation with another participant, where the second gradient data are gradient data obtained after the first gradient data are clipped; a first determining unit, configured to determine a fragment of third gradient data based on the fragment of the second gradient data and the fragment of the noise data, where the third gradient data are the second gradient data with the noise data added; and a second determining unit, configured to determine a fragment of a model parameter based on the fragment of the third gradient data.

A third aspect of the embodiments of this specification provides a computer device, including: at least one processor; and a memory storing program instructions, where the program instructions are configured to be suitable for execution by the at least one processor, and the program instructions include instructions used to perform the method according to the first aspect.

According to the technical solutions provided in the embodiments of this specification, a machine learning model is trained by combining a secure multi-party computation technology with a differential privacy technology. As such, privacy protection can be provided for not only data of a participant in a training process but also a trained machine learning model, thereby avoiding privacy information carried in the trained machine learning model from being stolen.

BRIEF DESCRIPTION OF DRAWINGS

To describe technical solutions in embodiments of this specification or in the existing technologies more clearly, the following briefly describes the accompanying drawings needed for describing the embodiments or the existing technologies. The accompanying drawings described below are merely some embodiments described in this specification, and a person of ordinary skill in the art can derive other accompanying drawings from these accompanying drawings without creative efforts.

DESCRIPTION OF EMBODIMENTS

Figure 1:
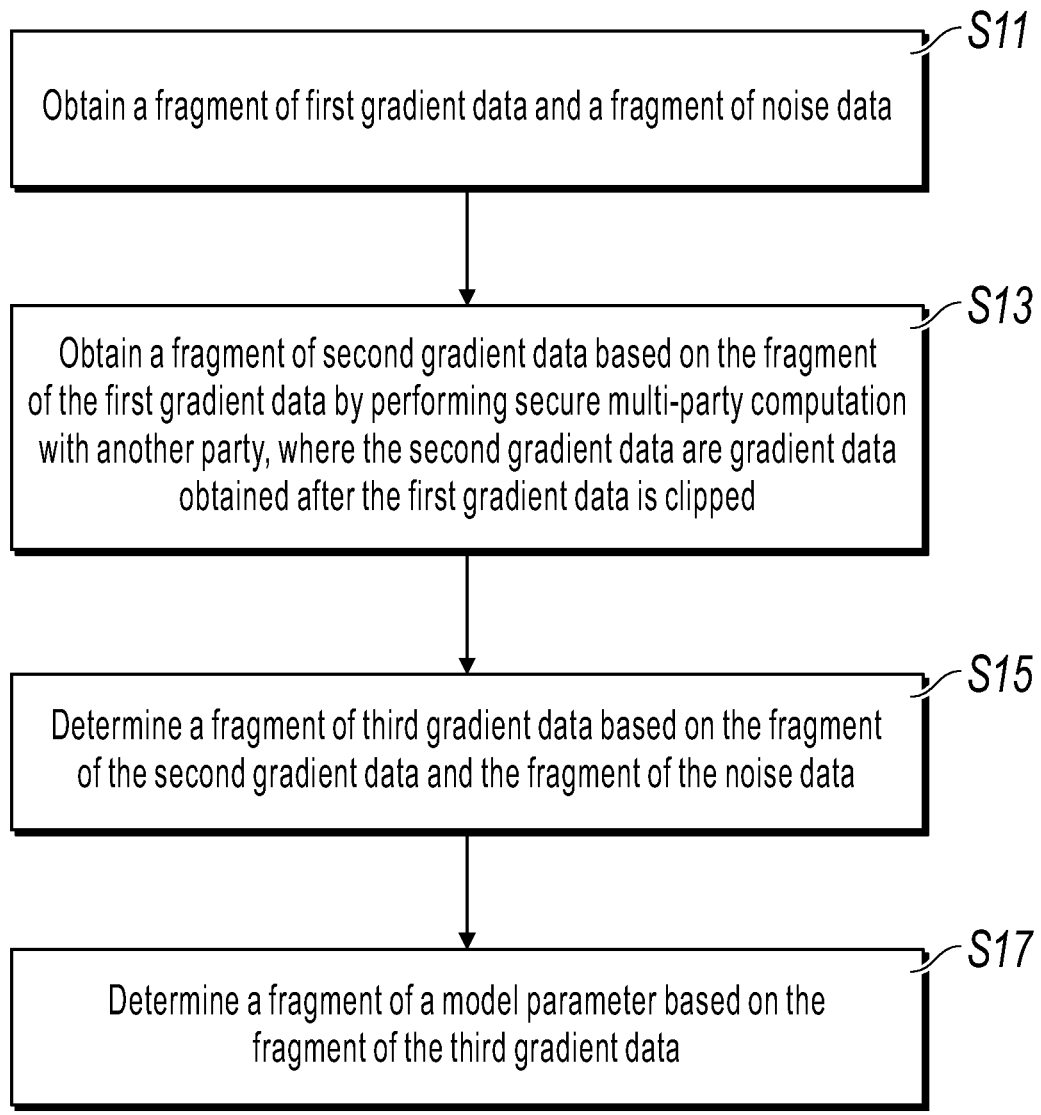
FIG. 1 is a schematic flowchart of a secure multi-party computation method for privacy protection according to some embodiments of this specification.

The following clearly and comprehensively describes technical solutions in embodiments of this specification with reference to accompanying drawings in the embodiments of this specification. Clearly, described embodiments are merely some rather than all of the embodiments of this specification. All other embodiments obtained by a person of ordinary skill in the art based on the embodiments of this specification without creative efforts shall all fall within the protection scope of this specification.

By using a secure multi-party computation technology, data privacy of each participant can be protected in a process of jointly training a machine learning model. However, the inventor finds that secure multi-party computation can provide privacy protection for a process of jointly training a machine learning model, but cannot provide privacy protection for a trained machine learning model. For example, training of a machine learning model relies on learning of training data. Therefore, a trained machine learning model can reflect characteristics of the training data. That is, the trained machine learning model carries privacy information of the training data. In this case, an attacker may steal, by using an attack method such as an inference attack or a model inversion attack, the privacy information carried in the trained machine learning model.

Differential privacy can be used to protect privacy by adding noise disturbance to data. Based on a differential privacy technology, in a process of jointly training a machine learning model, noise disturbance can be added to gradient data to reduce privacy information carried in a trained machine learning model, thereby providing privacy protection for the trained machine learning model.

The following describes terms involved in embodiments of this specification.

Secure multi-party computation (MPC) is a technology for protecting data privacy security. Secure multi-party computation enables multiple participants to perform collaborative computing processing without leaking their own data privacy. Secret sharing is a technology for implementing secure multi-party computation. An idea of secret sharing is to split a secret by using an appropriate method to obtain multiple fragments. The multiple fragments are respectively delivered to different participants for safekeeping. A single participant cannot recover the secret. The secret can be recovered only when several participants collaborate. The fragment can include an addition fragment. A sum of the multiple fragments can be equal to the secret. For example, in a (t,n) threshold secret sharing solution, a secret is split by using an appropriate method to obtain n fragments. The n fragments are delivered to n participants for safekeeping. A single participant cannot recover the secret, and the secret can be recovered only when at least t participants collaborate. The secret cannot be recovered in a case with less than t participants.

The secret sharing operation can be implemented based on a secret sharing protocol. Different secret sharing protocols are used to implement different types of secret sharing operations. Specifically, the secret sharing protocols can include an addition operation protocol, a multiplication operation protocol, a comparison operation protocol, a bit decomposition operation protocol, a suffix OR operation protocol, a modulo operation protocol, a truncation operation protocol, and the like.

The addition operation protocol is configured to implement a secret sharing-based addition operation. By using the addition operation protocol, a secret sharing-based addition operation can be performed on multiple pieces of data, to obtain a fragment of an addition result of the multiple pieces of data. For example, Alice holds a fragment [a]1 and a fragment [b]1, and Bob holds a fragment [a]2 and a fragment [b]2. [a]1+[a]2=a. [b]1+[b]2=b. Alice can add up the fragment [a]1 and the fragment [b]1 by using the addition operation protocol, to obtain a fragment [c]1. Bob can add up the fragment [a]2 and the fragment [b]2 by using the addition operation protocol, to obtain a fragment [c]2. [c]1+[c]2=c=a+b.

The multiplication operation protocol is configured to implement a secret sharing-based multiplication operation. By using the multiplication operation protocol, a secret sharing-based multiplication operation can be performed on multiple pieces of data, to obtain a fragment of a multiplication result of the multiple pieces of data. For example, Alice holds a fragment [a]1 and a fragment [b]1, and Bob holds a fragment [a]2 and a fragment [b]2. [a]1+[a]2=a. [b]1+[b]2=b. By using the multiplication operation protocol, Alice can perform secure multi-party computation based on the fragment [a]1 and the fragment [b]1, and Bob can perform secure multi-party computation based on the fragment [a]2 and the fragment [b]2. Alice can obtain a fragment [d]1. Bob can obtain a fragment [d]2. [d]1+[d]2=d=a×b.

The comparison operation protocol is configured to implement a secret sharing-based comparison operation. By using the comparison operation protocol, a secret sharing-based comparison operation can be performed on data to obtain a fragment of a comparison result. For example, Alice holds a fragment [a]1 and a comparison reference, and Bob holds a fragment [a]2 and the comparison reference. [a]1+[a]2=a. By using the comparison operation protocol, Alice can perform secure multi-party computation based on the fragment [a]1 and the comparison reference, and Bob can perform secure multi-party computation based on the fragment [a]2 and the comparison reference. Alice can obtain a fragment [r]1, and Bob can obtain a fragment [r]2. [r]1+[r]2=r. r represents a comparison result. r is set to 0 and 1. If r is 0, it indicates that the comparison reference is less than or equal to the data a. If r is 1, it indicates that the comparison reference is greater than the data a.

The bit decomposition operation protocol is configured to implement a secret sharing-based bit decomposition operation. By using the bit decomposition operation protocol, a secret sharing-based bit decomposition operation can be performed on data to obtain a fragment of at least one bit value. The bit value can be a value on a bit. For example, Alice holds a fragment [a]1, and Bob holds a fragment [a]2. [a]1+[a]2=a. By using the bit decomposition operation protocol, Alice can perform secure multi-party computation based on the fragment [a]1, and Bob can perform secure multi-party computation based on the fragment [a]2. Alice can obtain a fragment $[e_i]1$, and Bob can obtain a fragment $[e_i]2$. $[e_i]1+[e_i]2=e_i$. i is set to 1, 2, . . . , or k. k represents a quantity of bits of the data a. $e_i$ represents a bit value of an $i^{th}$ bit of the data a. $e_i$ is set to 0 and 1.

The suffix OR operation protocol is configured to implement a secret sharing-based suffix OR operation. By using the suffix OR operation protocol, a secret sharing-based suffix OR operation can be performed on a bit string to obtain a fragment of a suffix OR operation result. For example, a bit string $\{h_1, h_2, h_3, \ldots, h_k\}$ can be obtained by performing a suffix OR operation on a bit string $\{a_1, a_2, a_3, \ldots, a_k\}$. $h_1=a_1\cup a_2\cup \ldots \cup a_k$. $h_2=a_2\cup a_3\cup \ldots \cup a_k$. $h_3=a_3\cup a_4\cup \ldots \cup a_k$. $h_k=a_k$. $\cup$ represents the OR operation. Specifically, for example, Alice holds a bit string fragment $\{[a_1]1, [a_2]1, [a_3]1, \ldots, [a_k]1\}$, and Bob holds a bit string fragment $\{[a_1]2, [a_2]2, [a_3]2, \ldots, [a_k]2\}$. $[a_1]1+[a_1]2=a_1$, $[a_2]1+[a_2]2=a_2$, $[a_3]1+[a_3]2=a_3$, and $[a_k]1+[a_k]2=a_k$. By using the suffix OR operation protocol, Alice can perform secure multi-party computation based on the bit string fragment $\{[a_1]1, [a_2]1, [a_3]1, \ldots, [a_k]1\}$, and Bob can perform secure multi-party computation based on the bit string fragment $\{[a_1]2, [a_2]2, [a_3]2, \ldots, [a_k]2\}$. Alice can obtain a bit string fragment $\{[h_1]1, [h_2]1, [h_3]1, \ldots, [h_k]1\}$, and Bob can obtain a bit string fragment $\{[h_1]2, [h_2]2, [h_3]2, \ldots, [h_k]2\}$. $[h_1]1+[h_1]2=h_1$, $[h_2]1+[h_2]2=h_2$, $[h_3]1+[h_3]2=h_3$, and $[h_k]1+[h_k]2=h_k$.

The modulo operation protocol is configured to implement a secret sharing-based modulo operation. By using the modulo operation protocol, a secret sharing-based modulo operation can be performed on data to obtain a fragment of a modulus. The modulus can be a remainder obtained after dividing two numbers. For example, Alice holds a fragment [a]1 and a modulo reference, and Bob holds a fragment [a]2 and the modulo reference. [a]1+[a]2=a. By using the modulo operation protocol, Alice can perform secure multi-party computation based on the fragment [a]1 and the modulo reference, and Bob can perform secure multi-party computation based on the fragment [a]2 and the modulo reference. Alice can obtain a fragment [j]1, and Bob can obtain a fragment [j]2. [j]1+[j]2=j. j represents a remainder obtained after dividing the data a and the modulo reference. The modulo reference can be 2, 3, 5, or the like.

The truncation operation protocol is configured to implement a secret sharing-based truncation operation. By using the truncation operation protocol, a secret sharing-based truncation operation can be performed on data to obtain a fragment of a truncation result. The truncation operation can truncate the last tag bit of data (which is equivalent to dividing the data by $2^{tag}$). For example, Alice holds a fragment [a]1 and the tag, and Bob holds a fragment [a]2 and the tag. [a]1+[a]2=a. By using the truncation operation protocol, Alice can perform secure multi-party computation based on the fragment [a]1 and the tag, and Bob can perform secure multi-party computation based on the fragment [a]2 and the tag. Alice can obtain a fragment [l]1, and Bob can obtain a fragment [l]2. [l]1+[l]2=l. l represents a truncation result obtained after the last f bit of the data a is truncated.

It should be noted that, the secret sharing protocols (for example, the addition operation protocol, the multiplication operation protocol, the comparison operation protocol, the bit decomposition operation protocol, the suffix OR operation protocol, the modulo operation protocol, and the truncation operation protocol) can be implemented by using any appropriate method, including but not limited to a method that exists before the application date of this document and a method that has not emerged before the application date of this document. Specific implementations of the above-mentioned secret sharing protocols are not specifically limited in the embodiments of this specification.

Some embodiments of this specification provide a secure multi-party computation system for privacy protection.

The system can include multiple participants. The multiple participants are used to jointly train a machine learning model. The machine learning model can include a logistic regression model, a linear regression model, a decision tree model, a neural network model, and the like. In actual applications, the machine learning model can include a classification model and a regression model. The classification model is used for classification prediction. The classification model can include a risk identification model, an expense type identification model, a credit identification model, and the like. The risk identification model is used to identify transaction data, user accounts, and the like that have risks. The risks can include fraud risks, account hacking risks, and the like. The expense type identification model is used to identify an expense type (for example, an impulse type or a conservative type). The credit recognition model is used to identify a credit rating (for example, good credits or poor credits). The regression model is used for regression prediction. The multiple participants can include two, three, or more than three participants. The participants can include devices such as a smartphone, a portable computer, a personal computer, a server, and a server cluster including multiple servers.

The participants can train a machine learning model based on training data. The training data can include feature data and a label corresponding to the feature data. For example, the feature data can include account data, and the label can be used to indicate a risk type (for example, a high risk or a low risk) corresponding to the account data. For another example, the feature data can include user data, and the label can be used to indicate an expense type (for example, an impulse type or a conservative type) corresponding to the user data. For another example, the feature data can include transaction data, and the label can be used to indicate a credit rating (for example, good credits or poor credits) corresponding to the transaction data.

The training data can be distributed in the multiple participants in a form of secret sharing. Each participant can hold a fragment of the training data. Each participant cannot hold the complete training data for considerations of data security and privacy protection. Specifically, the participant can hold the feature data or the label. For example, the multiple participants can include two participants: a first participant and a second participant. The first participant can hold the feature data, and the second participant can hold the label. Or, the participant can hold a fragment of the feature data and/or a fragment of the label. For example, the multiple participants can include two participants: a first participant and a second participant. The first participant can hold one fragment of the feature data, and the second participant can hold the other fragment of the feature data and the label. Or, the first participant can hold one fragment of the feature data and one fragment of the label. The second participant can hold the other fragment of the feature data and the other fragment of the label.

The multiple participants can jointly train a machine learning model by using a gradient descent method. The gradient descent method can include an original gradient descent method and various variant methods (such as a batch gradient descent method and a regularized gradient descent method) that are based on the original gradient descent method. The regularized gradient descent method is a gradient descent method with a regularized term. Regularization can reduce complexity and instability of a model and reduce a risk of overfitting. Jointly training the machine learning model by using the gradient descent method can include multiple rounds of iteration processes. Each round of iteration processes can be used to optimize a model parameter of the machine learning model. Iteration termination conditions can include the following: A quantity of iteration times reaches a predetermined quantity of times, and loss data are less than or equal to a predetermined threshold. The loss data can be obtained by calculation based on a loss function. The loss function is used to measure a degree of difference between a prediction result and an actual result of the machine learning model. The loss function can include a square loss function, a logarithm loss function, a cross entropy loss function, or the like.

In a process of jointly training the machine learning model by using the gradient descent method, a model parameter of the machine learning model can be distributed in the multiple participants in a form of secret sharing. Each participant can hold a fragment of the model parameter. Each participant cannot hold the complete model parameter for considerations of data security and privacy protection.

Some embodiments of this specification provide a secure multi-party computation method for privacy protection. Data involved in the embodiments of this specification, for example, a fragment of gradient data, a fragment of noise data, a fragment of a model parameter, and a fragment of a model parameter, can be represented in a form of a fixed-point number, or can be represented in a form of a floating-point number. The method can be applied to any one of the multiple participants. The method can be used to implement any round of iteration process in the multiple rounds of iteration processes.

Figure 2:
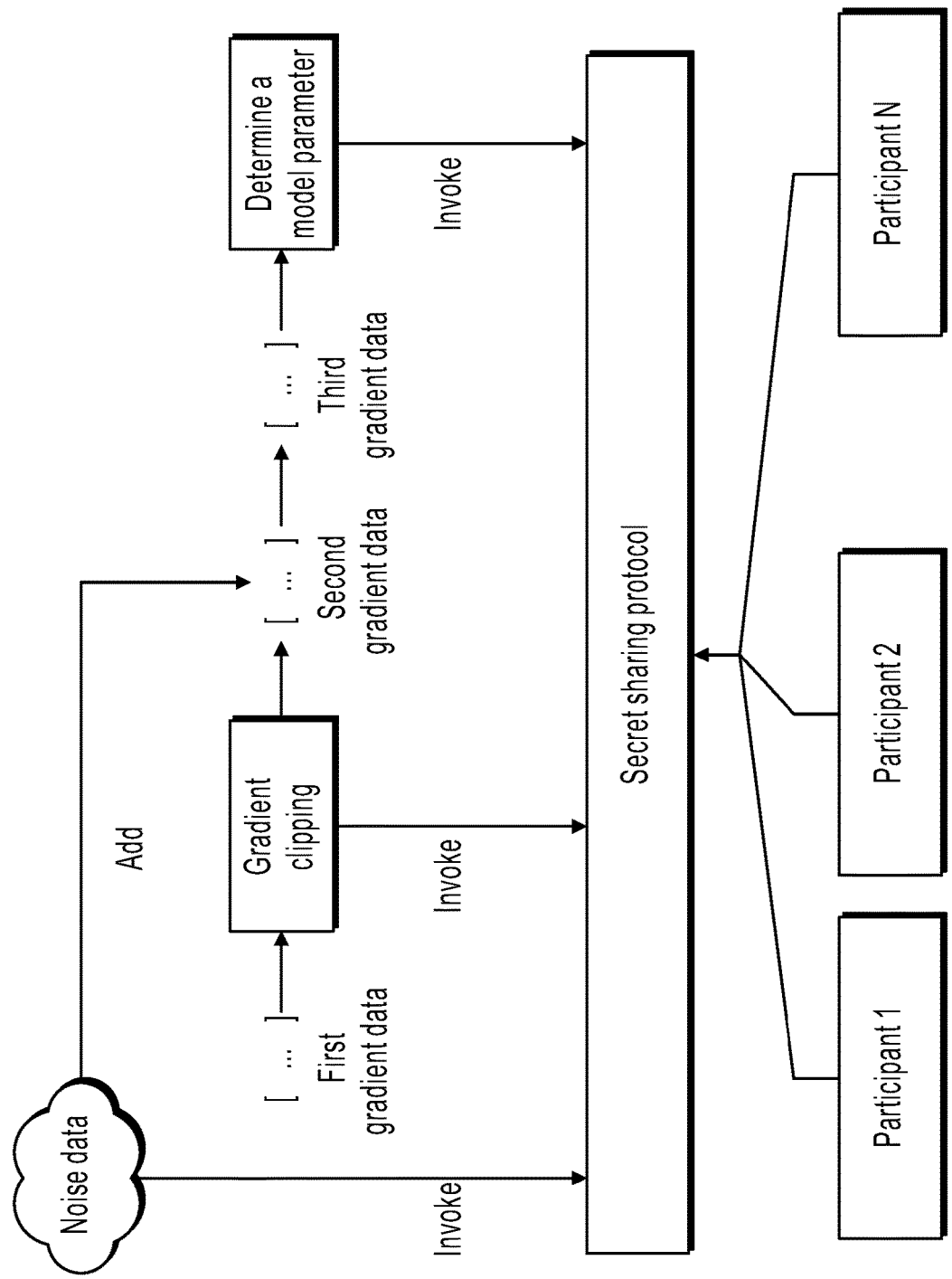
FIG. 2 is a schematic diagram of a secure multi-party computation process for privacy protection according to some embodiments of this specification.

Refer to both FIG. 1 and FIG. 2. The method can include the following steps.

Step S11: Obtain a fragment of first gradient data and a fragment of noise data.

In some embodiments, the participant can hold a fragment of training data and a fragment of a first model parameter. The fragment of the training data can include feature data or a label. Or, the fragment of the training data can include a fragment of feature data and/or a fragment of a label. If a current round of iteration process is the first round of iteration process, the first model parameter can be an initial model parameter. A fragment of the initial model parameter can be generated by the participant. Or, the initial model parameter can be split by a trusted third participant to obtain a fragment of the initial model parameter, and the fragment of the initial model parameter can be sent to the participant. The participant can receive the fragment of the initial model parameter. If the current round of iteration process is not the first round of iteration process, a fragment of the first model parameter can be obtained by the participant by using a previous round of iteration process.

The first gradient data can be a gradient value, a gradient vector, or a gradient matrix. The fragment of the first gradient data can be a fragment of a gradient value, a fragment of a gradient vector, or a fragment of a gradient matrix. The first gradient data can be gradient data of a loss function. The gradient data are used to determine a change status of the loss function relative to the model parameter to update the model parameter. The noise data can be a noise value, a noise vector, or a noise matrix. The fragment of the noise data can be a fragment of a noise value, a fragment of a noise vector, or a fragment of a noise matrix. The noise data are used to implement differential privacy. The noise data can include random noise data. The noise data can specifically include Gaussian noise data and Laplacian noise data.

In some embodiments, in a secure multi-party computation scenario, a fragment of a model prediction result can be obtained based on a fragment of training data by performing secure multi-party computation with another participant; and the fragment of the first gradient data can be obtained based on the fragment of the model prediction result by performing secure multi-party computation with the another participant. The performing secure multi-party computation with another participant can specifically include performing secure multi-party computation with the another participant by using a secret sharing protocol. The another participant can include a participant in the multiple participants other than the local participant. The multiple participants are used to jointly train a machine learning model.

A process of determining the fragment of the model prediction result can vary with a machine learning model. For example, if an operation involved in a hypothesis function is a linear operation, a fragment of a value of the hypothesis function can be obtained based on the fragment of the training data and the fragment of the first model parameter by performing secure multi-party computation with the another participant by using a secret sharing protocol, and the fragment of the value of the hypothesis function can be used as the fragment of the model prediction result. For another example, if an operation involved in the hypothesis function is a non-linear operation, considering that the non-linear operation cannot be implemented by using a secret sharing protocol, a fragment of a value of a polynomial (hereinafter referred to as a first polynomial) can be obtained based on the fragment of the training data and the fragment of the first model parameter by performing secure multi-party computation with the another participant by using a secret sharing protocol, and the fragment of the value of the first polynomial can be used as the fragment of the model prediction result. The hypothesis function is used to represent a mapping relationship between an input and an output of the machine learning model. The first polynomial is used to fit the hypothesis function.

For example, the machine learning model includes a linear regression model. The hypothesis function can be expressed as $h_\theta(x_1, x_2, \ldots, x_n) = \theta_0 + \theta_1 x_1 + \theta_2 x_2 + \ldots + \theta_n x_n$. $x_1, x_2, \ldots, x_n$ represents the feature data. $\theta_0, \theta_1, \theta_2, \ldots, \theta_n$ represents the model parameter. $x_1, x_2, x_n, \theta_0, \theta_1, \theta_2,$ and $\theta_n$ are distributed in the multiple participants in a form of secret sharing. The multiple participants are used to jointly train the linear regression model. Each participant holds fragments of $x_1, x_2, x_n, \theta_0, \theta_1, \theta_2,$ and $\theta_n$. The multiple participants can include a first participant and a second participant. By using a multiplication operation protocol, the first participant can perform secure multi-party computation based on a fragment $[x_1]1$ of $x_1$ and a fragment $[\theta_1]1$ of $\theta_1$, and the second participant can perform secure multi-party computation based on a fragment $[x_1]2$ of $x_1$ and a fragment $[\theta_1]2$ of $\theta_1$. The first participant can obtain a fragment $[\theta_1 x_1]1$ of $\theta_1 x_1$, and the second participant can obtain a fragment $[\theta_1 x_1]2$ of $\theta_1 x_1$. Similarly, the first participant can further obtain a fragment $[\theta_2 x_2]1$ of $\theta_2 x_2$ and a fragment $[\theta_n x_n]1$ of $\theta_n x_n$. The second participant can further obtain a fragment $[\theta_2 x_2]2$ of $\theta_2 x_2$ and a fragment $[\theta_n x_n]2$ of $\theta_n x_n$. The first participant can add up a fragment $[\theta_0]1$, the fragment $[\theta_1 x_1]1$, the fragment $[\theta_2 x_2]1$, and the fragment $[\theta_n x_n]1$ to obtain a fragment $[h_\theta(x_1, x_2, \ldots, x_n)]1$ of a model prediction result $h_\theta(x_1, x_2, \ldots, x_n)$. The second participant can add up a fragment $[\theta_0]2$, the fragment $[\theta_1 x_1]2$, the fragment $[\theta_2 x_2]2$, and the fragment $[\theta_n x_n]2$ to obtain a fragment $[h_\theta(x_1, x_2, \ldots, x_n)]2$ of the model prediction result $h_\theta(x_1, x_2, \ldots, x_n)$. $[\theta_0]1$ and $[\theta_0]2$ are fragments of the model parameter $\theta_0$.

A process of determining the fragment of the first gradient data can vary with a gradient function. For example, if an operation involved in the gradient function is a linear operation, a fragment of a value of the gradient function can be obtained based on the fragment of the model prediction result by performing secure multi-party computation with the another participant by using a secret sharing protocol, and the fragment of the value of the gradient function can be used as the fragment of the first gradient data. For another example, if an operation involved in the gradient function is a non-linear operation, considering that the non-linear operation cannot be implemented by using a secret sharing protocol, a fragment of a value of a polynomial (hereinafter referred to as a second polynomial) can be obtained based on the fragment of the model prediction result by performing secure multi-party computation with the another participant by using a secret sharing protocol, and the fragment of the value of the second polynomial can be used as the fragment of the first gradient data. The gradient function is a gradient function of the loss function. The gradient function is used to obtain gradient data of the loss function. The second polynomial is used to fit the gradient function.

Still in the above-mentioned example, the loss function can be expressed as $$J(\theta_0, \theta_1, \theta_2, \ldots, \theta_n) = \frac{1}{2m} \sum_{j=1}^{m} (h_\theta(x_0^{(j)}, x_1^{(j)}, \ldots, x_n^{(j)}) - y_j)^2.$$

$y_j$ represents the label. $y_j$ is distributed in the first participant and the second participant in a form of secret sharing. The gradient function can be expressed as $$\frac{\partial}{\partial \theta_i} J(\theta_0, \theta_1, \theta_2, \ldots, \theta_n).$$

i is set to 0, 1, 2, . . . , or n. For example, $$\frac{\partial}{\partial \theta_0} J(\theta_0, \theta_1, \theta_2, \ldots, \theta_n) = \frac{1}{m} \sum_{j=1}^{m} (h_\theta(x_0^{(j)}, x_1^{(j)}, \ldots, x_n^{(j)}) - y_j),$$

and $\frac{\partial}{\partial \theta_n} J(\theta_0, \theta_1, \theta_2, \ldots, \theta_n) = \frac{1}{m} \sum_{j=1}^{m} (h_\theta(x_0^{(j)}, x_1^{(j)}, \ldots, x_n^{(j)}) - y_j) x_n^{(j)}.$ By using a multiplication operation protocol, the first participant can perform secure multi-party computation based on the fragment $[h_\theta(x_1, x_2, \ldots, x_n)]1$ of the model prediction result and a fragment $[y_j]1$ of the label, and the second participant can perform secure multi-party computation based on the fragment $[h_\theta(x_1, x_2, \ldots, x_n)]2$ of the model prediction result and a fragment $[y_j]2$ of the label. The first participant can obtain a fragment $$\left[\frac{\partial}{\partial \theta_i} J(\theta_0, \theta_1, \theta_2, \ldots, \theta_n)\right]1$$

of the value of the gradient function and use it as one fragment of the first gradient data. The second participant can obtain a fragment $$\left[\frac{\partial}{\partial \theta_i} J(\theta_0, \theta_1, \theta_2, \ldots, \theta_n)\right]2$$

of the value of the gradient function and use it as the other fragment of the first gradient data.

The linear regression model has multiple model parameters. The loss function can have multiple gradient functions. The first gradient data can include multiple elements, and the fragment of the first gradient data can include multiple elements. For each gradient function (for example, $$\left(\text{for example, } \frac{\partial}{\partial \theta_n} J(\theta_0, \theta_1, \theta_2, \ldots, \theta_n)\right),$$

by using the multiplication operation protocol, the first participant can perform secure multi-party computation based on the fragment $[h_\theta(x_1, x_2, \ldots, x_n)]1$ of the model prediction result and the fragment $[y_j]1$ of the label, and the second participant can perform secure multi-party computation based on the fragment $[h_\theta(x_1, x_2, \ldots, x_n)]2$ of the model prediction result and the fragment $[y_j]2$ of the label. The first participant can obtain the fragment (for example, $$\left(\text{for example, } \left[\frac{\partial}{\partial \theta_n} J(\theta_0, \theta_1, \theta_2, \ldots, \theta_n)\right]1\right)$$

of the value of the gradient function and use it as an element in one fragment of the first gradient data. The second participant can obtain the fragment (for example, $$\left(\text{for example, } \left[\frac{\partial}{\partial \theta_n} J(\theta_0, \theta_1, \theta_2, \ldots, \theta_n)\right]2\right)$$

of the value of the gradient function and use it as an element in the other fragment of the first gradient data.

In some embodiments, in a secure multi-party computation scenario, a fragment of first sub-noise data can be generated; a fragment of second sub-noise data, sent by the another participant can be received; and the fragment of the noise data can be determined based on the fragment of the first sub-noise data and the fragment of the second sub-noise data. Specifically, first sub-noise data that follow a predetermined distribution can be generated; and the first sub-noise data can be split to obtain a fragment of the first sub-noise data. The predetermined distribution can include a Gaussian distribution, a Laplacian distribution, and the like. The first sub-noise data can be obtained by performing sampling on the predetermined distribution.

The participant can obtain multiple fragments of the first sub-noise data by splitting the first sub-noise data; can retain one fragment of the first sub-noise data; and can send at least one other fragment of the first sub-noise data to at least one other participant. Each other participant can obtain one fragment of the first sub-noise data. Therefore, the multiple fragments of the first sub-noise data are allocated to the multiple participants that are used to jointly train the machine learning model. Similarly, each other participant can generate the second sub-noise data; can split the second sub-noise data to obtain a fragment of the second sub-noise data; and can send one fragment of the second sub-noise data to the participant. The participant can obtain one fragment of the second sub-noise data. The participant can determine the fragment of the noise data based on the fragment of the first sub-noise data and the fragment of the second sub-noise data. For example, the participant can obtain the fragment of the noise data by adding up the fragment of the first sub-noise data and the fragment of the second sub-noise data.

For example, N participants are used to jointly train the machine learning model. N≥2. The participant can obtain N fragments of the first sub-noise data by splitting the first sub-noise data; can retain one fragment of the first sub-noise data; and can send N−1 other fragments of the first sub-noise data to N−1 other parties. Each other participant can obtain one fragment of the first sub-noise data. The participant can further receive N−1 fragments of the second sub-noise that are sent by the N−1 other parties. For example, the participant can obtain the fragment of the noise data by adding up the fragment of the first sub-noise data and the N−1 fragments of the second sub-noise.

The first sub-noise data can be a noise value, a noise vector, a noise matrix, or the like. The fragment of the first sub-noise data can be a fragment of a noise value, a fragment of a noise vector, a fragment of a noise matrix, or the like. Similarly, the second sub-noise data can be a noise value, a noise vector, a noise matrix, or the like.

The fragment of the second sub-noise data can be a fragment of a noise value, a fragment of a noise vector, a fragment of a noise matrix, or the like.

Each participant can generate a part of the sub-noise data; and can obtain the fragment of the noise data by aggregating the sub-noise data of each participant by using a secret sharing method. A process of determining the fragment of the noise data satisfies Byzantine robustness. In addition, the fragment of the noise data can be predetermined before step S11. As such, the fragment of the noise data can be directly obtained in step S11 to reduce computing overheads in a model training process. Certainly, the fragment of the noise data can alternatively be determined in step S11.

Step S13: Obtain a fragment of second gradient data based on the fragment of the first gradient data by performing secure multi-party computation with another participant, where the second gradient data are gradient data obtained after the first gradient data are clipped.

In some embodiments, the gradient data are used to determine a change status of the loss function relative to the model parameter to update the model parameter. However, when the model parameter is updated in a reverse propagation way, the gradient data may become very large in size, resulting in a gradient explosion. The gradient explosion results in a very large update of the model parameter. To avoid a gradient explosion problem, gradient clipping needs to be performed on the first gradient data to obtain the second gradient data. A norm of the second gradient data is less than or equal to a clipping threshold. For example, the first gradient data can be represented as g, and the second gradient data can be represented as $$g \times \min(1, \frac{C}{\|g\|_2}).$$

C is the clipping threshold, and $\|g\|_2$ represents a 2-norm of the first gradient data.

In some embodiments, in a secure multi-party computation scenario, the fragment of the second gradient data can be obtained based on the fragment of the first gradient data by performing secure multi-party computation with the another participant. Specifically, a fragment of a reciprocal of a first gradient data norm can be obtained based on the fragment of the first gradient data by performing secure multi-party computation with the another participant; a fragment of a first product can be obtained based on the fragment of the reciprocal of the first gradient data norm and a fragment of a clipping threshold by performing secure multi-party computation with the another participant; a fragment of a comparison result can be obtained based on the fragment of the first product and a comparison reference by performing secure multi-party computation with the another participant; and the fragment of the second gradient data can be determined based on the fragment of the comparison result. The comparison result is used to indicate a magnitude relationship between the first product and the comparison reference. The first product can be a product (for example, $$\left(\text{for example, } \frac{C}{\|g\|_2}\right)$$

of the reciprocal of the first gradient data norm and the clipping threshold. The comparison reference can include 1, 2, 4, 5, or the like. The performing secure multi-party computation with another participant can specifically include performing secure multi-party computation with the another participant by using a secret sharing protocol.

In some implementations of the embodiments, a fragment of g·g can be obtained based on a fragment of g by performing secure multi-party computation with the another participant; a fragment of x and a fragment of exp can be obtained based on the fragment of g·g by performing secure multi-party computation with the another participant; a fragment of $$\frac{1}{\sqrt{x}}$$

can be obtained based on the fragment of x by performing secure multi-party computation with the another participant; a fragment of $$2^{-\frac{exp}{2}}$$

can be obtained based on the fragment of exp by performing secure multi-party computation with the another participant; and a fragment of $$\frac{1}{\|g\|_2}$$

can be obtained based on the fragment of $$\frac{1}{\sqrt{x}}$$

and the fragment of $$2^{-\frac{exp}{2}}$$

by performing secure multi-party computation with the another participant. g represents the first gradient data. g·g represents an inner product of the first gradient data. g·g=x× $2^{exp}$. x falls within a predetermined value range. The predetermined value range can be [0.5, 1], [1, 2], or the like. exp can be an integer, for example, can be a positive integer.

The fragment of g·g can be obtained based on the fragment of g by performing secure multi-party computation with the another participant by using the multiplication operation protocol.

A fragment of $bit1_i$ can be obtained based on the fragment of g·g by performing secure multi-party computation with the another participant by using a bit decomposition operation protocol. $bit1_i$ is a bit value of an $i^{th}$ bit of g·g. i is set to 1, 2, . . . , or k. k represents a quantity of bits of g·g. A fragment {[$h_1$], [$h_2$], [$h_3$], . . . , [$h_k$]} of a bit string {$h_1$, $h_2$, $h_3$, . . . , $h_k$} can be obtained based on a fragment of a bit string {$bit1_1$, $bit1_2$, $bit1_3$, . . . , $bit1_k$} by performing secure multi-party computation with the another participant by using a suffix OR operation protocol.

A fragment [exp] of exp is equal to [$h_1$]+[$h_2$]+[$h_3$]+ . . . +[$h_k$]. The following can be calculated:

$$[m] = 1 + \sum_{i=0}^{k-2} 2^{k-2-i}(1 - [h_i]).$$

(A fragment [m×(g·g)] of m×(g·g) can be obtained based on [m] and [g·g] by performing secure multi-party computation with the another participant by using the multiplication operation protocol. The last k−f−1 bits of m×(g·g) can be truncated based on [m×(g·g)] by performing secure multi-party computation with the another participant by using a truncation operation protocol, so as to obtain a fragment [x] of x. Specifically, [x] can be obtained based on [m×(g·g)], k, and f by invoking a Div2mp protocol. [x]=Div2mp([m×(g·g)], k, k−f−1). [g·g] represents the fragment of g·g. f represents a bit order of a bit at which a decimal point in data is located (for example, f is a bit order of a bit at which a decimal point in a fixed-point number is located).

A fragment of a value of a polynomial (hereinafter referred to as a third polynomial) can be obtained based on the fragment [x] of x by performing secure multi-party computation with the another participant by using a secret sharing protocol. A fragment of $$\frac{1}{\sqrt{x}}$$

can be determined based on the fragment of the value of the third polynomial. The third polynomial is used to fit $$\frac{1}{\sqrt{x}}.$$

For example, the third polynomial can be represented as $0.8277x^2 - 2.046x + 2.223$. Specifically, the fragment of the value of the third polynomial can be directly used as the fragment of $$\frac{1}{\sqrt{x}}.$$

Or, a maximum value of a fitting error between the third polynomial and $$\frac{1}{\sqrt{x}}$$

can be obtained, and the fragment of $$\frac{1}{\sqrt{x}}$$

can be obtained by subtracting the maximum value from the fragment of the value of the third polynomial.

A fragment [Lsb] of Lsb can be obtained based on the fragment [exp] of exp by performing secure multi-party computation with the another participant by using a modulo operation protocol. Lsb represents a bit value at a least-significant bit of exp. Lsb can be understood as a modulus obtained by exp modulo 2. The last one bit of exp can be truncated based on [exp] by performing secure multi-party computation with the another participant by using the truncation operation protocol, so as to obtain $$\left[\frac{\exp}{2}\right].$$

Specifically, $$\left[\frac{\exp}{2}\right]$$

can be obtained based on [exp], k, and 1 by invoking the Div2mp protocol.

$$\left[\frac{\exp}{2}\right] = Div2mp([\exp], k, 1).$$

A fragment of $bit2_i$ can be obtained based on $$\left[f - \frac{\exp}{2}\right]$$

by performing secure multi-party computation with the another participant by using the bit decomposition operation protocol. $bit2_i$ is a bit value of an $i^{th}$ bit of $$\left(f - \frac{\exp}{2}\right).$$

i is set to 1, 2, . . . , or k.

$$\left[2^{f-\frac{\exp}{2}}\right]$$

can be obtained based on a fragment of $\{bit2_1, bit2_2, bit2_3, \ldots, bit2_k\}$ by performing secure multi-party computation with the another participant by using the multiplication operation protocol.

$$\left[2^{f-\frac{\exp}{2}}\right] = \left(1 + [bit2_1] \times (2^{2^1} - 1)\right) \times \left(1 + [bit2_2] \times (2^{2^2} - 1)\right) \times$$
$$\left(1 + [bit2_3] \times (2^{2^3} - 1)\right) \times \cdots \times \left(1 + [bit2_k] \times (2^{2^k} - 1)\right).$$

The following can be calculated:

$$\left[2^{f-\frac{\exp}{2}-\frac{1}{2}}\right] = \left[2^{f-\frac{\exp}{2}}\right] \times 2^{-\frac{1}{2}}. \quad \left[2^{-\frac{\exp}{2}}\right]$$

can be obtained based on $$\left[2^{f-\frac{\exp}{2}}\right] \text{ and } \left[2^{f-\frac{\exp}{2}-\frac{1}{2}}\right]$$

by performing secure multi-party computation with the another participant by using the multiplication operation protocol.

$$\left[2^{-\frac{\exp}{2}}\right] = \left[2^{f-\frac{\exp}{2}-\frac{1}{2}}\right] \times [Lsb] + \left[2^{f-\frac{\exp}{2}}\right] \times (1 - [Lsb]).$$

It should be noted that, in the above-mentioned expression, multiplying fragments of two pieces of data can be understood as obtaining a fragment of a product of the two pieces of data based on the fragments of the two pieces of data by performing secure multi-party computation with the another participant by using the multiplication operation protocol. For example, $$\left[2^{f-\frac{exp}{2}-\frac{1}{2}}\right] \times [Lsb]$$

can be understood as obtaining $$\left[2^{f-\frac{exp}{2}-\frac{1}{2}} \times Lsb\right]$$

based on $$\left[2^{f-\frac{exp}{2}-\frac{1}{2}}\right]$$

and [Lsb] by performing secure multi-party computation with the another participant by using the multiplication operation protocol.

A fragment of $$\frac{1}{\|g\|_2}$$

can be obtained based on the fragment of $$\frac{1}{\sqrt{x}}$$

and a fragment of $$2^{-\frac{exp}{2}}$$

by performing secure multi-party computation with the another participant by using the multiplication operation protocol.

In some implementations of the embodiments, the fragment of $$\frac{C}{\|g\|_2}$$

can be obtained based on the fragment of the reciprocal $$\frac{1}{\|g\|_2}$$

of the first gradient data norm and the fragment of the clipping threshold C by performing secure multi-party computation with the another participant by using the multiplication operation protocol.

In some implementations of the embodiments, the fragment of the comparison result can be obtained based on the fragment of $$\frac{C}{\|g\|_2}$$

and 1 by performing secure multi-party computation with the another participant by using a comparison operation protocol. The comparison result is used to indicate a magnitude relationship between $$\frac{C}{\|g\|_2}$$

and 1.

In some implementations of the embodiments, a fragment of a value of a predetermined equation can be obtained based on the fragment of the comparison result, the fragment of the first product, and the fragment of the first gradient data by performing secure multi-party computation with the another participant; and the fragment of the value of the predetermined equation can be used as the fragment of the second gradient data. The predetermined equation is used to indicate the following: if the comparison reference is less than or equal to the first product, a product of the first gradient data and the comparison reference is used as the second gradient data; or if the comparison reference is greater than the first product, a product of the first gradient data and the first product is used as the second gradient data. For example, the comparison reference can be 1. The predetermined equation can be expressed as $$1 - u + \frac{C}{\|g\|_2} \times u.$$

u represents the comparison result. If u is 0, it indicates that the comparison reference is less than or equal to the first product. If u is 1, it indicates that the comparison reference is greater than the first product.

Step S15: Determine a fragment of third gradient data based on the fragment of the second gradient data and the fragment of the noise data.

In some embodiments, the third noise data can be a noise value, a noise vector, a noise matrix, or the like. The fragment of the third noise data can be a fragment of a noise value, a fragment of a noise vector, a fragment of a noise matrix, or the like.

The third gradient data are the second gradient data with the noise data added. As such, noise disturbance can be added to the second gradient data to reduce privacy information carried in a trained machine learning model, thereby implementing differential privacy protection.

In some embodiments, a fragment of an addition result of the second gradient data and the noise data can be obtained by adding up the fragment of the second gradient data and the fragment of the noise data, and can be used as the fragment of the third noise data. Or, a fragment of a multiplication result of the second gradient data and the noise data can be obtained based on the fragment of the second gradient data and the fragment of the noise data by performing secure multi-party computation with the another participant by using the multiplication operation protocol, and can be used as the fragment of the third gradient data.

Step S17: Determine a fragment of a model parameter based on the fragment of the third gradient data.

In some embodiments, the participant can hold a learning rate. The participant can determine a fragment of a second product based on the fragment of the third gradient data and the learning rate; and determine the fragment of the model parameter based on the fragment of the second product. The second product is a product of the third gradient data and the learning rate. A fragment of a second model parameter can be obtained by performing subtraction on the fragment of the third gradient data and the fragment of the first model parameter. For example, the following can be calculated: [p2]=[p1]−α×[q]. [p2] represents the fragment of the second model parameter. [p1] represents the fragment of the first model parameter. a represents the learning rate. [q] represents the fragment of the third gradient data.

In some embodiments, it can be determined whether the iteration termination conditions are satisfied. If yes, the fragment of the second model parameter can be used as a fragment of a final model parameter. If no, the fragment of the second model parameter can be used as a new fragment of the first model parameter, and steps S11 to S17 can be continued until the iteration termination conditions are satisfied.

According to the secure multi-party computation method provided in the embodiments of this specification, a machine learning model is trained by combining a secure multi-party computation technology with a differential privacy technology. As such, privacy protection can be provided for not only data of a participant in a training process but also a trained machine learning model, thereby avoiding privacy information carried in the trained machine learning model from being stolen.

Figure 3:
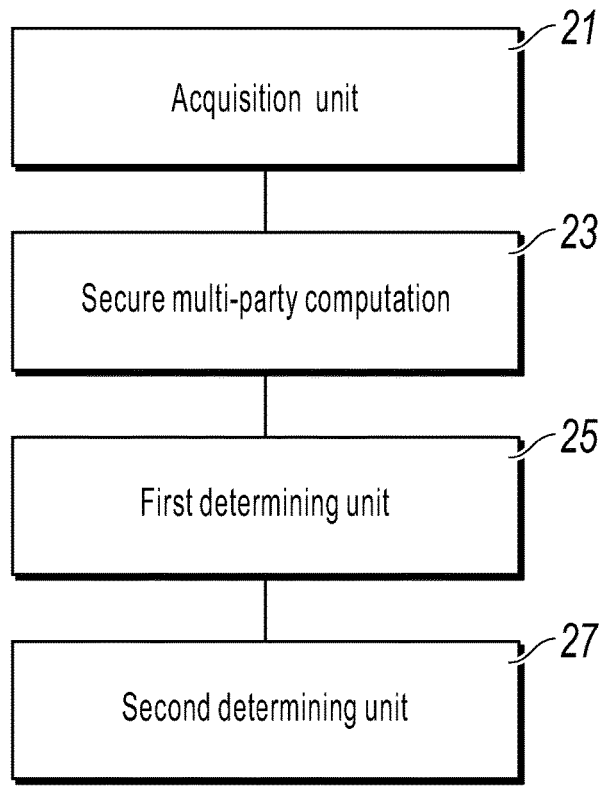
FIG. 3 is a schematic structural diagram of a secure multi-party computation apparatus for privacy protection according to some embodiments of this specification.

Refer to FIG. 3. Some embodiments of this specification provide a secure multi-party computation apparatus for privacy protection. The apparatus is applied to any one of multiple parties, and the apparatus includes the following:
  an acquisition unit 21, configured to obtain a fragment of first gradient data and a fragment of noise data, where the first gradient data are gradient data of a loss function;
  a secure multi-party computation unit 23, configured to obtain a fragment of second gradient data based on the fragment of the first gradient data by performing secure multi-party computation with another participant, where the second gradient data are gradient data obtained after the first gradient data are clipped;
  a first determining unit 25, configured to determine a fragment of third gradient data based on the fragment of the second gradient data and the fragment of the noise data, where the third gradient data are the second gradient data with the noise data added; and
  a second determining unit 27, configured to determine a fragment of a model parameter based on the fragment of the third gradient data.

Figure 4:
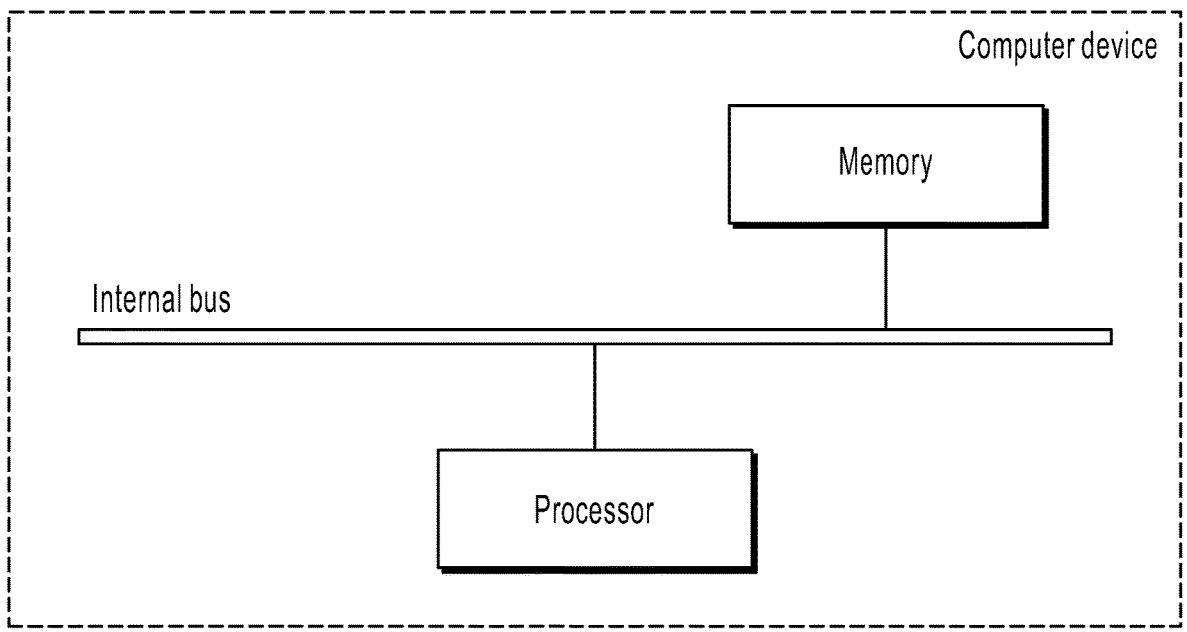
FIG. 4 is a schematic structural diagram of functions of a computer device according to some embodiments of this specification.

Refer to FIG. 4. Some embodiments of this specification further provide a computer device.

The computer device can include a memory and a processor.

The memory includes but is not limited to a dynamic random access memory (DRAM) and a static random access memory (SRAM). The memory can be configured to store computer instructions.

The processor can be implemented by using any appropriate method. For example, the processor can be in a form of a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microcontroller. The processor can be configured to execute the computer instructions to implement the embodiment corresponding to FIG. 1.

This specification further provides some embodiments of a computer storage medium. The computer storage medium includes but is not limited to a random access memory (RAM), a read-only memory (ROM), a cache, a hard disk drive (HDD), and a memory card. The computer storage medium stores computer program instructions. When the computer program instructions are executed, program instructions or modules in the embodiment corresponding to FIG. 1 in this specification are implemented.

It should be noted that, the embodiments in this specification are described in a progressive way. For same or similar parts of the embodiments, references can be made to the embodiments mutually. Each embodiment focuses on a difference from other embodiments. Particularly, apparatus embodiments and computer device embodiments are similar to method embodiments, and therefore are described briefly. For related parts, references can be made to related descriptions in the method embodiments. In addition, it can be understood that, a person skilled in the art can, after reading the document of this specification, figure out any combination of some or all of the embodiments listed in this specification without creative efforts. These combinations also fall within the protection scope disclosed in this specification.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

The system, apparatus, module, or unit illustrated in the above-mentioned embodiments can be implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

It can be learned from the descriptions of the above-mentioned implementations that, a person skilled in the art can clearly understand that this specification can be implemented by software and a necessary general-purpose hardware platform. Based on such an understanding, the technical solutions of this specification essentially or the part contributing to the existing technologies can be embodied in a form of a software product. The computer software product can be stored in a storage medium, such as a ROM/RAM, a magnetic disk, or an optical disc, and includes several instructions for enabling a computer device (which can be a personal computer, a server, a network device, or the like) to perform the method described in embodiments of this specification or some parts of the embodiments.

This specification can be applied to numerous general-purpose or special-purpose computer system environments or configurations, for example, a personal computer, a server computer, a handheld device or a portable device, a tablet device, a multi-processor system, a microprocessor-based system, a set top box, a programmable consumer electronic device, a network PC, a small-scale computer, a large-scale computer, and a distributed computing environment that includes any of the above-mentioned systems or devices.

This specification can be described in common contexts of computer-executable instructions executed by a computer, such as a program module. Generally, the program module includes a routine, a program, an object, a component, a data structure, etc. executing a specific task or implementing a specific abstract data type. This specification can also be practiced in distributed computing environments. In the distributed computing environments, tasks are performed by remote processing devices that are connected through a communications network. In a distributed computing environment, the program module can be located in both local and remote computer storage media including storage devices.

Although this specification is depicted by using embodiments, it is known to a person of ordinary skill in the art that, this specification has many variations and changes without departing from the spirit of this specification, and it is desired that the appended claims include these variations and changes without departing from the spirit of this specification.

What is claimed is:

1. A computer-implemented method providing secure multi-party computation for privacy protection, comprising:
obtaining a fragment of first gradient data and a fragment of noise data, wherein the first gradient data is gradient data of a loss function, and wherein obtaining the fragment of the noise data comprises:
generating first sub-noise data that follows a predetermined distribution;
splitting the first sub-noise data to obtain a fragment of the first sub-noise data;
receiving a fragment, of second sub-noise data, sent by another participant; and
determining, based on the fragment of the first sub-noise data and the fragment of the second sub-noise data, the fragment of the noise data;
obtaining, based on the fragment of first gradient data by performing secure multi-party computation with the another participant, a fragment of second gradient data, wherein the second gradient data is gradient data obtained after the first gradient data is clipped;
determining, based on the fragment of second gradient data and the fragment of noise data, a fragment of third gradient data, wherein the third gradient data is the second gradient data with the noise data added; and
determining a fragment of a model parameter based on the fragment of third gradient data.

2. The computer-implemented method of claim 1, wherein obtaining a fragment of first gradient data, comprises:
obtaining, based on a fragment of training data by performing secure multi-party computation with the another participant, a fragment of a model prediction result; and
obtaining, based on the fragment of a model prediction result by performing secure multi-party computation with the another participant, the fragment of first gradient data.

3. The computer-implemented method of claim 1, wherein
splitting the first sub-noise data to obtain the fragment of the first sub-noise data comprises:
splitting the first sub-noise data into multiple fragments; and
sending a fragment of the first sub-noise data to the another participant to allocate the multiple fragments to multiple parties.

4. The computer-implemented method of claim 1, wherein obtaining a fragment of second gradient data, comprises:
obtaining, based on the fragment of first gradient data by performing secure multi-party computation with the another participant, a fragment of a reciprocal of a first gradient data norm;
obtaining, by performing secure multi-party computation with the another participant, a fragment of a first product based on the fragment of the reciprocal of the first gradient data norm and a fragment of a clipping threshold, wherein the first product is a product of the reciprocal of the first gradient data norm and the clipping threshold;
obtaining, based on the fragment of a first product and a comparison reference by performing secure multi-party computation with the another participant, a fragment of a comparison result, wherein the comparison result is used to indicate a magnitude relationship between the first product and the comparison reference; and
determining, based on the fragment of a comparison result, the fragment of second gradient data.

5. The computer-implemented method of claim 4, wherein the obtaining a fragment of a reciprocal of a first gradient data norm, comprises:
obtaining, based on a fragment of g by performing secure multi-party computation with the another participant, a fragment of g·g, wherein g represents the first gradient data, and g·g represents an inner product of the first gradient data;

obtaining, based on the fragment of g·g by performing secure multi-party computation with the another participant, a fragment of x and a fragment of exp, wherein x and exp satisfy a condition g·g=x×$2^{exp}$;

obtaining, based on the fragment of x by performing secure multi-party computation with the another participant, a fragment of $$\frac{1}{\sqrt{x}};$$

obtaining, based on the fragment of exp by performing secure multi-party computation with the another participant, a fragment of $$2^{-\frac{exp}{2}}$$

aining, based on the fragment of $$\frac{1}{\sqrt{x}}$$

and the fragment of $$2^{-\frac{exp}{2}}$$

rming secure multi-party computation with the another participant, a fragment of $$\frac{1}{\|g\|_2}.$$

6. The computer-implemented method of claim 5, wherein obtaining, based on the fragment of x by performing secure multi-party computation with the another participant, a fragment of $$\frac{1}{\sqrt{x}},$$

comprises:
  obtaining, based on the fragment of x by performing secure multi-party computation with the another participant, a fragment of a value of a polynomial; and
  using the fragment of a value of a polynomial as the fragment of $$\frac{1}{\sqrt{x}},$$

wherein the polynomial is used to fit $$\frac{1}{\sqrt{x}}.$$

7. The computer-implemented method of claim 4, wherein determining, based on the fragment of a comparison result, the fragment of second gradient data, comprises:
  obtaining, based on the fragment of a comparison result, the fragment of a first product, and the fragment of first gradient data by performing secure multi-party computation with the another participant, a fragment of a value of a predetermined equation; and
  using the fragment of a value of a predetermined equation as the fragment of second gradient data, wherein the predetermined equation is used to indicate:
    if the comparison reference is less than or equal to the first product, a product of the first gradient data and the comparison reference is used as the second gradient data; or
    if the comparison reference is greater than the first product, a product of the first gradient data and the first product is used as the second gradient data.

8. The computer-implemented method of claim 1, wherein determining a fragment of third gradient data, comprises:
  adding the fragment of second gradient data and the fragment of noise data to obtain the fragment of third gradient data.

9. The computer-implemented method of claim 1, wherein determining a fragment of a model parameter, comprises:
  determining a fragment of a second product based on the fragment of third gradient data and a learning rate, wherein the second product is a product of the third gradient data and the learning rate; and
  determining the fragment of the model parameter based on the fragment of a second product.

10. A non-transitory, computer-readable medium storing one or more instructions executable by a computer system to perform one or more operations providing secure multi-party computation for privacy protection, comprising:
  obtaining a fragment of first gradient data and a fragment of noise data, wherein the first gradient data is gradient data of a loss function, and wherein obtaining the fragment of the noise data comprises:
    generating first sub-noise data that follows a predetermined distribution;
    splitting the first sub-noise data to obtain a fragment of the first sub-noise data;
    receiving a fragment, of second sub-noise data, sent by another participant; and
    determining, based on the fragment of the first sub-noise data and the fragment of the second sub-noise data, the fragment of the noise data;
  obtaining, based on the fragment of first gradient data by performing secure multi-party computation with the another participant, a fragment of second gradient data, wherein the second gradient data is gradient data obtained after the first gradient data is clipped;
  determining, based on the fragment of second gradient data and the fragment of noise data, a fragment of third gradient data, wherein the third gradient data is the second gradient data with the noise data added; and determining a fragment of a model parameter based on the fragment of third gradient data.

11. The non-transitory, computer-readable medium of claim 10, wherein obtaining a fragment of first gradient data, comprises:
obtaining, based on a fragment of training data by performing secure multi-party computation with the another participant, a fragment of a model prediction result; and
obtaining, based on the fragment of a model prediction result by performing secure multi-party computation with the another participant, the fragment of first gradient data.

12. The non-transitory, computer-readable medium of claim 10, wherein
splitting the first sub-noise data to obtain the fragment of the first sub-noise data comprises:
splitting the first sub-noise data into multiple fragments; and
sending a fragment of the first sub-noise data to the another participant to allocate the multiple fragments to multiple parties.

13. The non-transitory, computer-readable medium of claim 10, wherein obtaining a fragment of second gradient data, comprises:
obtaining, based on the fragment of first gradient data by performing secure multi-party computation with the another participant, a fragment of a reciprocal of a first gradient data norm;
obtaining, by performing secure multi-party computation with the another participant, a fragment of a first product based on the fragment of the reciprocal of the first gradient data norm and a fragment of a clipping threshold, wherein the first product is a product of the reciprocal of the first gradient data norm and the clipping threshold;
obtaining, based on the fragment of a first product and a comparison reference by performing secure multi-party computation with the another participant, a fragment of a comparison result, wherein the comparison result is used to indicate a magnitude relationship between the first product and the comparison reference; and
determining, based on the fragment of a comparison result, the fragment of second gradient data.

14. The non-transitory, computer-readable medium of claim 13, wherein the obtaining a fragment of a reciprocal of a first gradient data norm, comprises:
obtaining, based on a fragment of g by performing secure multi-party computation with the another participant, a fragment of g·g, wherein g represents the first gradient data, and g·g represents an inner product of the first gradient data;
obtaining, based on the fragment of g·g by performing secure multi-party computation with the another participant, a fragment of x and a fragment of exp, wherein x and exp satisfy a condition $g \cdot g = x \times 2^{exp}$;
obtaining, based on the fragment of x by performing secure multi-party computation with the another participant, a fragment of $$\frac{1}{\sqrt{x}};$$

obtaining, based on the fragment of exp by performing secure multi-party computation with the another participant, a fragment of $$2^{-\frac{exp}{2}}$$

aining, based on the fragment of $$\frac{1}{\sqrt{x}}$$

and the fragment of $$2^{-\frac{exp}{2}}$$

rming secure multi-party computation with the another participant, a fragment of $$\frac{1}{\|g\|_2}.$$

15. The non-transitory, computer-readable medium of claim 14, wherein obtaining, based on the fragment of x by performing secure multi-party computation with the another participant, a fragment of $$\frac{1}{\sqrt{x}},$$

comprises:
obtaining, based on the fragment of x by performing secure multi-party computation with the another participant, a fragment of a value of a polynomial; and
using the fragment of a value of a polynomial as the fragment of $$\frac{1}{\sqrt{x}},$$

wherein the polynomial is used to fit $$\frac{1}{\sqrt{x}}.$$

16. The non-transitory, computer-readable medium of claim 13, wherein determining, based on the fragment of a comparison result, the fragment of second gradient data, comprises:
obtaining, based on the fragment of a comparison result, the fragment of a first product, and the fragment of first gradient data by performing secure multi-party computation with the another participant, a fragment of a value of a predetermined equation; and
using the fragment of a value of a predetermined equation as the fragment of second gradient data, wherein the predetermined equation is used to indicate:

if the comparison reference is less than or equal to the first product, a product of the first gradient data and the comparison reference is used as the second gradient data; or if the comparison reference is greater than the first product, a product of the first gradient data and the first product is used as the second gradient data.

17. The non-transitory, computer-readable medium of claim 10, wherein determining a fragment of third gradient data, comprises:

adding the fragment of second gradient data and the fragment of noise data to obtain the fragment of third gradient data.

18. The non-transitory, computer-readable medium of claim 10, wherein determining a fragment of a model parameter, comprises:

determining a fragment of a second product based on the fragment of third gradient data and a learning rate, wherein the second product is a product of the third gradient data and the learning rate; and determining the fragment of the model parameter based on the fragment of a second product.

19. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations providing secure multi-party computation for privacy protection, comprising:

obtaining a fragment of first gradient data and a fragment of noise data, wherein the first gradient data is gradient data of a loss function, and wherein obtaining the fragment of the noise data comprises:

generating first sub-noise data that follows a predetermined distribution;

splitting the first sub-noise data to obtain a fragment of the first sub-noise data;

receiving a fragment, of second sub-noise data, sent by another participant; and determining, based on the fragment of the first sub-noise data and the fragment of the second sub-noise data, the fragment of the noise data;

obtaining, based on the fragment of first gradient data by performing secure multi-party computation with the another participant, a fragment of second gradient data, wherein the second gradient data is gradient data obtained after the first gradient data is clipped;

determining, based on the fragment of second gradient data and the fragment of noise data, a fragment of third gradient data, wherein the third gradient data is the second gradient data with the noise data added; and determining a fragment of a model parameter based on the fragment of third gradient data.

20. The computer-implemented system of claim 19, wherein obtaining a fragment of first gradient data, comprises:

obtaining, based on a fragment of training data by performing secure multi-party computation with the another participant, a fragment of a model prediction result; and obtaining, based on the fragment of a model prediction result by performing secure multi-party computation with the another participant, the fragment of first gradient data.

\* \* \* \* \*

UNITED STATES PATENT AND TRADEMARK OFFICE
CERTIFICATE OF CORRECTION

PATENT NO. : 12,418,399 B2
APPLICATION NO. : 18/358690
DATED : September 16, 2025
INVENTOR(S) : Wenqiang Ruan et al.

Page 1 of 1

It is certified that error appears in the above-identified patent and that said Letters Patent is hereby corrected as shown below:

In the Claims

Column 21, Lines 21-23, Claim 5, please replace "$2^{\frac{exp}{2}}$" with -- $2^{-\frac{exp}{2}}$; and --.

Column 21, Line 25, Claim 5, please replace "aining," with -- obtaining, --.

Column 21, Line 38, Claim 5, please replace "rming" with -- by performing --.

Column 24, Lines 6-8, Claim 14, please replace "$2^{\frac{exp}{2}}$" with -- $2^{-\frac{exp}{2}}$; and --.

Column 24, Line 9, Claim 14, please replace "aining," with -- obtaining, --.

Column 24, Line 21, Claim 14, "rming" with -- by performing --.

Signed and Sealed this
Fourth Day of November, 2025

John A. Squires
*Director of the United States Patent and Trademark Office*